United States Patent
Matsumoto et al.

(10) Patent No.: US 6,324,641 B1
(45) Date of Patent: Nov. 27, 2001

(54) PROGRAM EXECUTING APPARATUS AND PROGRAM CONVERTING METHOD

(75) Inventors: Kenshi Matsumoto, Koshigaya; Yasuhito Koumura, Tokyo-to; Hiroki Miura, Kawaguchi, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/157,811

(22) Filed: Sep. 18, 1998

(30) Foreign Application Priority Data

Sep. 22, 1997 (JP) .................................... 9-256313

(51) Int. Cl.[7] .................................................. G06F 15/00
(52) U.S. Cl. ........................... 712/220; 712/221; 712/223
(58) Field of Search .................................. 712/2, 3, 4, 10, 712/11, 20, 22, 23, 220, 221, 233, 234, 36, 222, 224, 235

(56) References Cited

U.S. PATENT DOCUMENTS

| | | | |
|---|---|---|---|
| 4,742,466 * | 5/1988 | Ochiai et al. ........................... | 714/45 |
| 4,947,315 * | 8/1990 | Sokolow et al. ...................... | 395/705 |
| 5,542,075 * | 7/1996 | Ebcioglu et al. ..................... | 395/709 |
| 5,721,872 * | 2/1998 | Katsuta ................................. | 711/163 |
| 5,794,029 * | 8/1998 | Babaian et al. ....................... | 712/241 |
| 5,809,306 * | 9/1998 | Suzuki et al. ......................... | 395/705 |
| 5,896,292 * | 4/1999 | Hosaka et al. .................. | 364/468.15 |
| 5,943,250 * | 8/1999 | Kim et al. ............................. | 708/625 |
| 6,012,836 * | 1/2000 | Mangelsdorf ........................ | 364/489 |
| 6,134,648 * | 10/2000 | Peterson et al. ....................... | 712/41 |

* cited by examiner

*Primary Examiner*—Eddie Chan
*Assistant Examiner*—Dzung C. Nguyen
(74) *Attorney, Agent, or Firm*—Pillsbury Winthrop LLP

(57) ABSTRACT

To simplify the process relative to an instruction array including an instruction for a process with flag handling executed by a compiler when converting a high-level program into in a format executable by a program executing apparatus, a number of operating circuits, namely, an ALU circuit and a AND operation circuit, are provided to operate in parallel to handle different flags in a flag group based on the results of respective operations. A value comparison instruction and a bit test instruction are converted into common operation process instructions, and branch instructions, dependent on the result of the execution of the operation process instructions, are prepared so as to detect different flag patterns. The common use of an operation instruction for a number of flag-handling instructions simplifies a compiler judgement.

5 Claims, 2 Drawing Sheets

PROGRAM EXECUTING APPARATUS AND PROGRAM CONVERTING METHOD

BACKGROUND OF THE INVENTION

1. Field of the Invention

This invention relates to a program executing apparatus provided with a flag for use in process control, and to a program converting method for preparing an instruction described in a language executable by the apparatus, such as machine language.

2. Description of the Related Art

The term "a program executing apparatus" used in this specification refers to an apparatus, such as a microprocessor, for executing a program prepared in an executable data format, such as, consisting of an instruction described in a machine language. A microprocessor is a typical example of such an apparatus, though it is not limited to a single integrated circuit.

The term "a program converting method" refers to a method for converting a program described in a high-level programming language, such as C or FORTRAN, based on grammar understandable for people, to a program including an instruction array in a data format executable by the program executing apparatus. A program before conversion, i.e., a program described in a high-level programming language, will be hereinafter referred to as a source program; a converted program, i.e., a program having an instruction array in a data format executable by the program executing apparatus, will be referred to as an assembler program. Also, an instruction described in a high-level language will be referred to as a high-level instruction; an instruction prepared by a compiler interpreting a high-level instruction will be referred to as a low-level instruction, and generally refers to an assembler instruction.

Referring to FIG. 1 showing a schematic structure of a conventional program executing apparatus, a high-level instruction program is generally translated by a compiler into assembler language, and then by an assembler into machine language. A memory 4 can store a program described in machine language.

An assembler instruction is expressed by means of a code called a mnemonic code, which is defined so as to easily express the function of an instruction. For example, the codes "add", "comp", "tst", and "br" are used to represent an add operation, a compare operation, a bit test operation, and a branch operation, respectively. Generally, each assembler instruction comprises one of the above codes indicative of an operation and one or two operands. Generally, one machine language instruction is created based on one assembler instruction.

An instruction fetching section 2 acts as a fetching means for sequentially fetching the instructions constituting a program from the memory 4, which are expressed in a machine language of a binary format.

A fetched binary instruction is sent to an instruction decoding section 6. In response to the binary instruction, the instruction decoding section 6 controls the operations of a register group 8, an Arithmetic Logic Unit (ALU) 10, a data access section 12, and a flag 14. For example, in response to an instruction which designates a register number, a value is either read from or written in the designated register in the register group 8. The value read from the register is sent to the ALU 10. The ALU 10 then executes an operation according to an operation code included in the instruction, so that the resultant value is stored via the data access section 12 in either the register group 8 or the memory 4. In a case that the operation executed by the ALU 10 accompanies a process for setting a value to a flag, or flag handling, the value of the flag 14 is updated accordingly.

As described above, a compiler converts a source program into an assembler program. Specifically, the compiler interrupts a high-level instruction and reduces it to, generally, two or more low-level instructions.

A compiler is also able to optimize the thus prepared assembler program so as to be adapted to high speed processing. The optimization is achieved through reordering of the assembler instructions. In the reordering, whether or not the instructions depend on each other must be taken into account as the program might otherwise end up with a different result. For example, based on a high-level instruction which instructs "to compare the content of two registers 'reg0' and 'reg1', i.e., 'R0' and 'R1', so as to branch to a point 'LEBEL1' in the program if RL=R0 is held", a compiler makes the following instruction array, comp/eq reg0, reg1 br LABEL1.

In response to the first instruction "comp/eq rego, reg1", rego and reg1 are compared so that a flag T is set with "1" if R1=R0 is held. Then, in response to the second instruction "br", the operating flow branches to a designated point "LABEL1" if the flag T indicates "1".

These instructions cannot be executed in a reverse order, and desirably include no other instruction or instruction array inserted into between them as that could change the value of the flag T.

Other examples of an instruction array with mutual dependency are shown below.

In response to the following instruction comp/ge reg0, reg1 br LABEL1, the operating flow branches to LABEL1 if R1≧R0 is held.

In response to the following instruction comp/gt reg0, reg1 br LABEL1 the operation flow branches to LEBEL1 if R1>R0 is held.

With the above instructions, the flag T is set with "1" if the R0 and R1 meet a predetermined condition, similar to the first example.

Yet another example is:

tst reg0, reg1 br LABEL1

In response to the "tst" instruction, a logical product of the content of the two registers 'reg0' and 'reg1', i.e., 'R0' and 'R0', is calculated so that the flag T is set with the value "1" if the resultant logical product is "0". Further, in response to the "br" instruction, as described above, an operating flow branches to "LABEL1" if the flag T indicates "1". These instructions also have mutual dependency in terms of an execution order (mutual order dependency).

Note that the code "tst" is used to instruct a bit test so as to determine if the value of a predetermined bit of an object value is 0 or 1. For example, in a bit test with respect to R1, R0 is set with a value whose bit corresponding to the bit to be tested (a test bit) of R1 is "1", and a logical product of R1 and R0 is obtained. If the resultant logical product is not "0", it is known that the value of the test bit of R1 is "1". On the other hand, if the local product is "0", it is known that the value of the test bit is "0".

For optimization of an assembler program, a compiler must detect whether or not each instruction in the program is the one, such as "comp/eq", "comp/ge", "comp/gt", or "tst", which accompanies flag handling and therefore depends on other instructions in terms of an execution order.

Conventionally, operations are executed by an ALU, which thus must discriminate a variety of operations. For this discrimination purpose, different codes, such as "comp" and "tst", are used for different operations. As a result, quite a few number of different operation codes are used to discriminate a variety of instructions which accompany flag handling and are thus mutually dependent in terms of an execution order. This resultantly complicates the compiler's judgement to be made when using a program converting method, to detect whether or not each instruction has mutual dependency in terms of an execution order.

Further, the common use of a single flag by a number of different types of instructions will impose severe limitation on mutual order dependency of the instructions and impair productivity in programming by an assembler and readability of an assembler program.

SUMMARY OF THE INVENTION

The present invention has been conceived to overcome the above problems and aims to provide a program executing apparatus and a program converting method which achieve simpler processing by a compiler, easier programming by an assembler, and easier readying of an assembler program.

According to a first aspect of the present invention, there is provided a program executing apparatus, comprising fetching section for sequentially fetching instructions; decoding section for decoding the instructions fetched; flag holding section for holding a number of flags corresponding to different states; and operation executing section for executing the instructions, which execute a number of predetermined operations each accompanying a process for changing a flag, by using inputted operands commonly in the predetermined operations, to handle the flags allotted for each predetermined operation, according to results of the predetermined operations.

In this invention, the operation executing section executes a number of operations in response to a single instruction, i.e., an instruction of one type. Specifically, when one instruction and one or more sets of operands are received, the operation executing section executes a number of different types of operations individually handling the flags, but commonly using the supplied operands. In each operation, a different flag is used. The flag holding section holds all results of flag handling relative to all operations executed by the operation executing section using the supplied operands. In other words, the result of flag handling associated with a desired operation is known by referring to the flag holding section.

Further, in the above program executing apparatus, the operation executing section includes a number of operation circuits for executing the predetermined operations in parallel by using the operands commonly in the predetermined operations, such that each operation circuit executes each the predetermined operation to handle the flag allotted to the predetermined operation according to the result of the predetermined operation.

According to the present invention, a dedicated operation circuit is provided for each operation with flag handling. These operation circuits operate in parallel to process the supplied operand.

Still further, in the above program executing apparatus, the number of operation circuits include an ALU circuit and an AND logic operation circuit.

The arithmetic and logic unit (ALU), for example, can compare two supplied data items to see which is larger or smaller by calculating, for example, their difference. The comparison result is held by setting a predetermined status to a flag according to the comparison result, i.e., whether the difference is a positive or negative value, or it is zero or not zero. An AND circuit, on the other hand, can obtain a logical product of the two data items, so that the result is held by setting a predetermined status to a flag which is different from the one used for the ALU circuit according to the result, i.e., whether it is zero or not zero.

According to a second aspect of the present invention, there is provided a program converting method for converting a program including a high-level instruction described in a high-level programming language, into a number of low-level instructions corresponding to a machine language executable by a program executing apparatus, wherein the program converting method converts a high-level flag-using instruction into the number of low-level instructions including an operation process instruction and a flag dependent process instruction, the high-level flag-using instruction for executing the predetermined operation to set the flags allotted to the predetermined operation according to the result of the predetermined operation so that flag dependent process is executed based on the flag, the operation process instruction for executing the predetermined operations by the operation executing section using the inputted operands, to set the flags according to results of the predetermined operations, and the flag dependent process instruction for executing of the flag dependent process based on the flag set by the operation circuit which executed the predetermined operation instructed by the high-level flag-using instruction.

"A low-level instruction" is an instruction, such as an assembler instruction, for instructing a unit operation of the program executing apparatus. "Flag dependent process" is processing which varies depending on the status of a flag. For example, an operation flow branches to a designated point in a program only if a flag is set with a predetermined status.

According to the present invention, in response to a single operation instruction, a number of operation circuits execute in parallel, and each set a value to a different flag depending on the operation result.

As "a flag dependent process instruction", a low-level instruction is prepared based on a high-level instruction, which instructs reference to the same flag as that to which the original high-level flag-using instruction also instructs to refer. That is, each flag has a different role, and respective roles can be easily discriminated by the difference of flag dependent instructions.

Further, in the program converting method of the second aspect of the present, a common instruction code is used for low-level operation process instructions converted from a number of high-level flag-using instructions for executing different operation.

As described above, the prepared flag dependent process instruction instructs reference to the same flag to which the original high-level flag-using instruction also instructs reference. That is, the operations to be executed in response to various high-level flag-using instructions partly differ from one another in that a uniquely allotted flag is referred to in executing a predetermined flag dependent process, but partly the same in that all of the provided operation circuits operate in parallel to execute operations. Therefore, according to this invention, a common instruction code can be used to make an operation process instruction with respect to different high-level flag-using instructions.

Further, in the above program converting method, a number of the high-level flag-using instructions include an arithmetic condition branch instruction and a logical condition branch instruction, the arithmetic condition branch instruction instructing execution of an operation for comparing two operand values to see which is larger/smaller to set/reset the flag according to a comparison result, and execution of the flag-dependent process for having an operating flow branch to a predetermined address of the program according to the flag, and the logical condition branch instruction instructing execution of an operation for obtaining a logical product of the two operands to set/reset the flag according to whether the local product is zero or not zero, and execution of the flag-dependent process for having an operating flow branch to a predetermined address of the program according to the flag.

BRIEF DESCRIPTION OF THE DRAWINGS

The above and the other objects, features, and advantages of the present invention will become further apparent from the following description of the preferred embodiment taken in conjunction with the accompanying drawings wherein.

DESCRIPTION OF THE PREFERRED EMBODIMENT

In the following, a preferred embodiment of the present invention will be described referring to the accompanying drawings.

Figure 1:
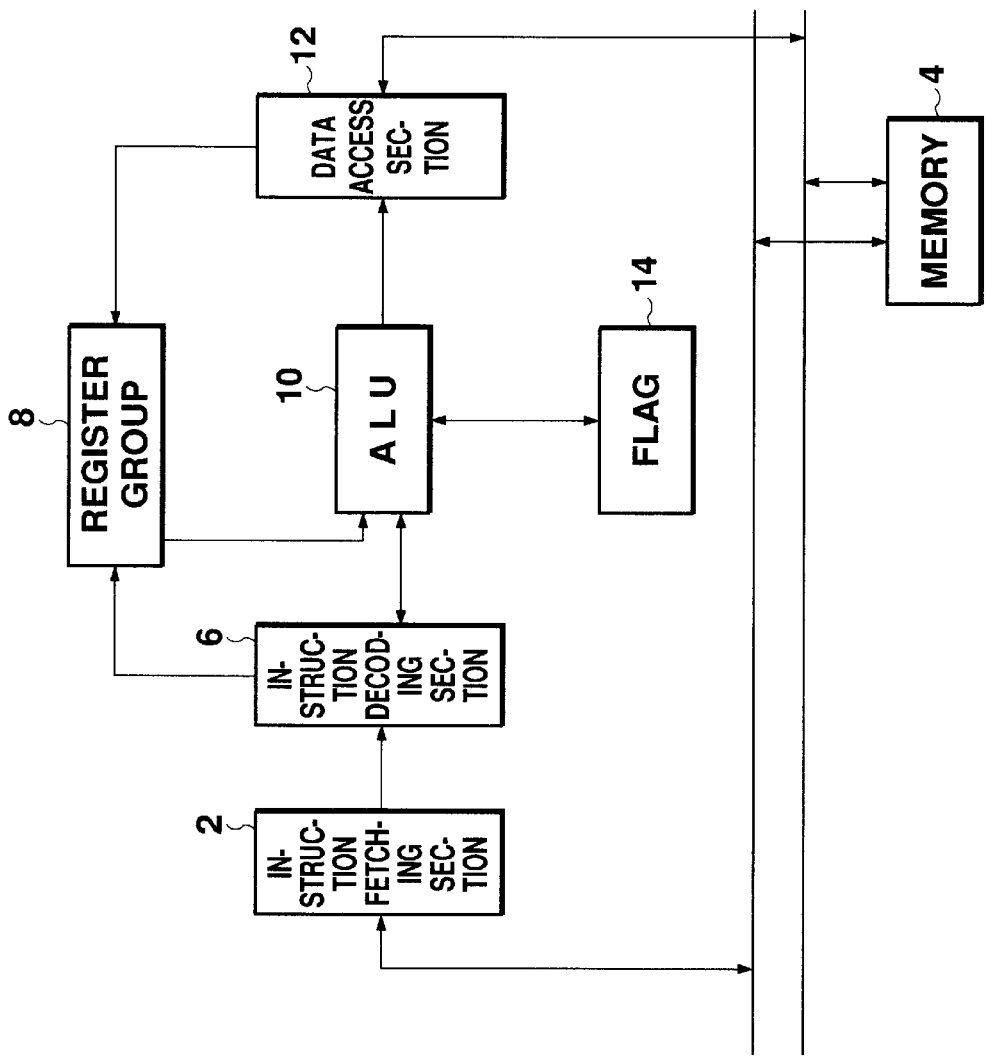
FIG. 1 is a block diagram showing a schematic structure of a conventional program executing apparatus.
Figure 2:
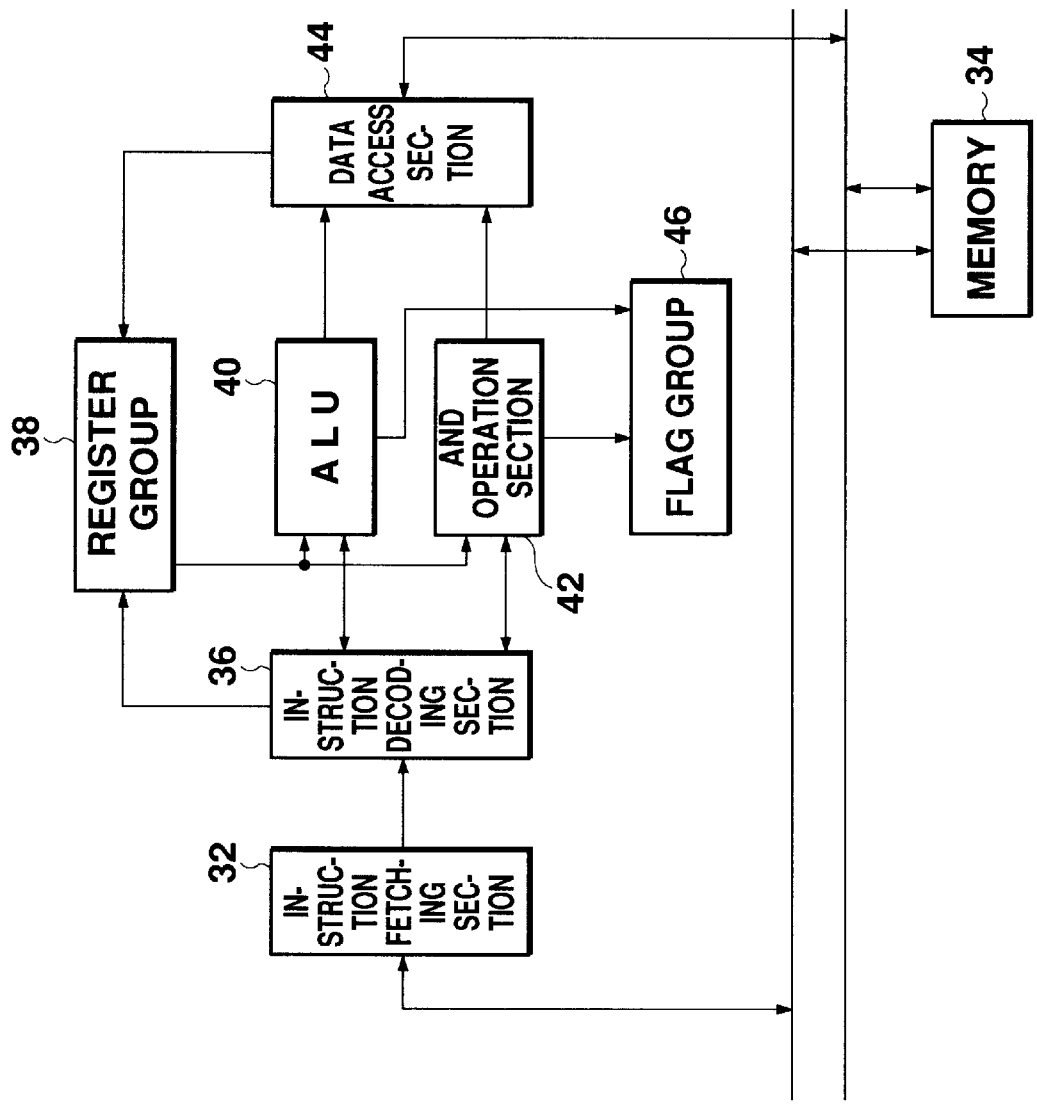
FIG. 2 is a block diagram showing a schematic structure of a program executing apparatus according to a preferred embodiment of the present invention.

Referring to FIG. 2 showing a schematic structure of a program executing apparatus according to a preferred embodiment of this invention illustrated in the form of a block diagram, an instruction fetching section 32 acts as a fetching section for sequentially fetching machine-language instructions which were prepared corresponding to respective instructions consisting an assembler program and stored in a memory 34.

Fetched instructions are sent to an instruction decoding section 36. According to the binary status of the instruction, the instruction decoding section 36 controls the operations of a register group 38, an ALU 40, an AND operation section (AND logic operation circuit) 42, a data accessing section 44, and a flag group 46 (a flag holding section). For example, in response to an instruction which designates a register number, a value is read from or written into the designated register in the register group 38. The value read from the register is then sent to the ALU 40. Also, in response to an instruction including an immediate value as an operand, the ALU 40 and the AND operation section 42 execute relevant operations using the value.

According to the apparatus of this invention, two different operation circuits, namely an ALU 40 and an AND operation circuit 42, are provided in parallel so that an immediate value or a value read from a designated register is inputted to both in parallel.

With a value inputted, the ALU 40 executes an operation according to an operation code indicative of addition, subtraction, or the like, and loads the operation result via a data access section 44 to a register group 38 or a memory 34. When the operation executed by the ALU 40 accompanies a process for setting a predetermined flag, the status of the concerned flag is updated accordingly.

On the other hand, with a value inputted, the AND operation section 42 obtains a logical product of the two received values. That is, in this apparatus, the AND operation section 42 receives two data items, and conducts a bit test using one as mask data to detect whether or not the other data item (test data) has a bit pattern matching to that of the mask data. Note that only the predetermined one or more bits to be tested of the mask data is/are set with the value "1", which will be referred to as a "test bit". The AND operation section 42, which may comprise an AND circuit, obtains a logical product of the test data and the mask data. If the obtained logical product is "0", the flag T in the flag group 46 is set with "1". If it is not "0", the flag T is reset, or set with "0".

As a result, the flag T is set with "0", or flag T=0, when any of the test bits in the test data is "1", and it is set with "1", or flag T=1, when all of the test bits are "0".

Alternatively, the AND section 42 may be constructed to detect whether or not all text bits are "1". Specifically, the AND operation section 42 has an AND circuit for obtaining a logical product of corresponding bits of the mask data and the test data, and an XOR circuit for obtaining an exclusive OR value of the corresponding bits of the mask data and the logical product obtained by the AND circuit.

With this structure, the AND circuit initially outputs test data whose bits other than a test bit or bits are changed to have the value "0" while the test bit or bits are left as is. The XOR circuit then obtains an exclusive OR value of the outputted test data and the mask data. It is known, if the obtained exclusive OR value has the value "0" for all bits thereof, that all test bits of the test data are "1". Utilizing this fact, the flag T is set with, for example, "0" when the output of the XOR circuit has "0" for all bits thereof, and with "1" when "1".

The flag group 46 includes flags Z, N, V, C and so on in addition to the flag T. The AND operation section 4 handles the flag T only, and the ALU 40 handles the other flags, namely, flags Z, N, V, and C, but not the flag T. The flag T is referred to as a test flag as it indicates the result of a bit test. The flag Z is referred to as a zero flag as it is set with "1" if the operation by the ALU 40 results in "0" and reset to "0" if otherwise. The flag N is referred to as a negative flag and is set with "1" if the operation by the ALU 40 has a negative result, and reset to "0" if the value is positive or zero. The flag V is referred to as an overflow-flag as is set with "1" if the operation by the ALU 40 causes an overflow to a sign bit, and reset to "0" if otherwise. The flag C is referred to as a carrier flag as is set with the value "1" if the operation by the ALU 40 causes a carry, and reset to "0" if otherwise.

According to the present invention, in response to a machine language instruction prepared based on an assembler instruction, not only does the ALU 40 execute an operation designated by the instruction, but the AND operation section 42 also parallely executes an AND operation using the two operands designated by the instruction. Operation results by the ALU circuit 40 and the AND operation section 42 do not interfere with each other because the AND operation section 42 uses a flag T to hold the operation result, which is different from the flags used by the ALU circuit 40. Therefore, one or both of the operation results by the two operation circuits can be desirably selected for use in subsequent processes of the program.

It should be noted that, in addition to the above described structure, in which a number of different types of operation circuits are provided to act as operation executing section for executing a number of different operations in parallel, an ALU 40 may also be solely provided to execute the respective operations by itself using the same supplied data. For example, in view of the above example, a sole ALU 40 may sequentially execute an AND operation accompanying handling of a flag T and other operations accompanying handling of other flags. Also in this case, results of the respective operations do not interfere. Still alternatively, instead of the above structure in which two different types of operation circuits, namely, an ALU 40 and an AND operation section 42, are provided, three or more operating circuits each handling a different flag may be provided so that they execute operations in parallel. Also note that flags are not limited to the aforementioned five types.

A program converting method for preparing an assembler instruction by converting an instruction described in a highlevel programming language, such as C-language and Fortran, based on the grammar understandable for people, into assembler instructions corresponding to a machine language executable by the aforementioned apparatus will next be described.

In the following, a preferred embodiment incorporating this method will be described by referring to a compiler.

In general, there are a number of instructions descried in a high-level programming language, which designate a process for handling a flag based on an operation result and another process to be conducted based on the value of the flag (a high-level flag-using instruction). Examples of such instructions are shown below which each designate two values "A", "B" and a branch address "LABEL1," the address corresponding to a line number or a label of a program.

(i) "if A>B, jump to LABEL 1."
(ii) "if A≧B, jump to LABEL 1."
(iii) "if A<B, jump to LABEL 1."
(iv) "if A≦B, jump to LABEL 1."
(v) "if A=B, jump to LABEL 1."
(vi) "if A≠B, jump to LABEL 1."
(vii) "if a logical product A·B=0, jump to LABEL 1."

Basically, (i) to (vi) are arithmetic condition branch instructions to determine whether or not to branch based on the relationship between "A" and "B". (vii) is a logical condition branch instruction to determine whether or not to branch based on the result of a bit test. These high-level instructions (i) to (vii) are converted into an assembler instruction array for instructing execution of a predetermined operation based on "A" and "B" to set a value to a flag according to the operation result so that whether or not to branch is determined based on the value of the flag. In other words, they are converted into an instruction array comprising an operation process instruction for having an operation circuit execute an operation using "A" and "B" to set a flag accordingly, and a flag dependent branch instruction for having the operating flow branch according to the status of the flag.

A compiler of this embodiment generates a common instruction code "comp", and branch instruction codes "br.gt", "br.ge", "br.lt" "br.le", "br.eq", "br.neq", and "br.t" respectively for the above instructions (i) to (vii). In response to these branch instruction codes, the operating flow does or does not branch according to the different value patterns of a flag/flags set in the flag group 46 of the program executing apparatus of this invention.

Based on the instruction (i), the following assembler instruction array will be basically prepared.

comp A,B
br. gt LABEL1

Similarly, the instructions (ii) to (vii) are converted into a "comp" instruction and any of the above "br" instructions.

In the following, the way the thus prepared assembler instructions are executed will be described.

In response to a "comp" instruction which is commonly used for the high-level instructions (i) to (vii), the ALU 40 and the AND operation section 42 execute respectively assigned operations. Specifically, the ALU 40 obtains the difference between the operands A and B, or "A−B", so that the flag N is set with "1", or flag N=1, when A−B<0 is held, or the flag Z is similarly set, or flag Z=1, when A−B=0 is held. In parallel, the AND operation section 42 obtains a logical product of the operands A and B, so that the flag T is set with "1", or flag T=1, when the obtained logical product is "0". In this manner, flags N, Z, and T are set with an appropriate value as a result of execution of an "comp" instruction.

Then, in response to the respective "br" instructions for the high-level instructions (i) to (vii), the following operations are executed.

In response to a "br.gt" instruction for the instruction (i), the operating flow branches when flag N=0 and flag Z=0. The flag T is not referred to here.

In response to a "br.ge" instruction for the instruction (ii), the operating flow branches when flag N=0. The flags Z and T are not referred to here.

In response to a "br.lt" instruction for the instruction (iii), the operating flow branches when flag N=1 and flag Z=0. The flag T is not referred to here.

In response to a "br.le" instruction for the instruction (iv), the operating flow branches when flag N=1 or flag Z=1. The flag T are not referred to here.

In response to a "br.eq" instruction for the instruction (v), the operating flow branches when flag Z=1. The flags N and T are not referred to here.

In response to a "br.eq" instruction for the instruction (vi), the operating flow branches when flag Z=0. The flags N and T are not referred to here.

In response to a "br.t" instruction for the instruction (vii), the operating flow branches when flag T=1. The flags N and Z is not referred to here.

As described above, in response to a branch instruction, an operating flow branches depending on a unique flag pattern. That is, each operating circuit of the program executing apparatus handles a different flag in executing a branch instruction. Therefore, when executing a particular branch instruction, only the result of a "comp" operation which was executed by an operation circuit which handles the flag relative to that branch instruction, is referred to while the result by other operation circuits can be ignored.

In summary, according to the program executing apparatus of this invention, it is possible to commonly use the same operation instruction for various high-level instructions which instruct a value comparison operation and a bit test operation with flag handling. When optimizing an assembler program, a compiler reorders the instructions such that an operation instruction with flag handling and the following branch instruction using that flag are not separated by another instruction using that flag. Specifically, a compiler detects whether or not each of the instructions constituting an assembler program accompanies flag handling, and, if it does, deals with that instruction and the following branch instruction as an inseparable set during optimization.

According to the present invention, the number of types of an operation instruction with flag handling can be reduced, which can resultantly simplify a compiler's judgement to be made in executing an instruction with flag handling.

According to the program executing apparatus of this invention, a number of flags are prepared corresponding to a number of different types of operations accompanying flag handling so that such operations are executed irrespective of the operation type. That is, a common operation instruction can be used for a number of operations with flag handling. This arrangement can simplify a compiler's judgement as to whether or not each instruction accompanies flag handling to be made in optimization of an assembler program, so that the size and a processing load of the compiler can be reduced. Also, a different flag is handled in a different operation so that interference between flags can be avoided among different operations. This can facilitates programming by an assembler and reading of an assembler program.

According to the program converting method of this invention, an assembler program is prepared in which a common operation instruction is used for operations with flag handling for the aforementioned program executing apparatus. This arrangement can simplify a compiler's judgement as to whether or not each instruction accompanies flag handling to be made in optimization of an assembler program, so that the size and a processing load of the compiler can be reduced. Also, a different flag is handled in a different operation so that interference between flags can be avoided among different operations. This can facilitates programming by an assembler and reading of an assembler program.

What is claimed is:

1. A program executing apparatus, comprising:
   a fetching section for sequentially fetching instructions;
   a decoding section for decoding the instructions fetched;
   a flag holding section for holding a number of flags corresponding to different states; and
   an operation executing section for executing the decoded instructions, having one operation circuit for executing an operation corresponding to an instruction decoded by said decoding section and changing at least one flag, and at least one operation circuit for executing a predetermined operation independently from said decoded instruction and changing at least one flag,
   wherein the operation circuits execute a number of operations in parallel, each accompanying a process for changing a flag by using inputted operands commonly in the predetermined operation to handle the flags allotted for each operation according to results of the operations.

2. A program executing apparatus according to claim 1, wherein the operation circuits include an arithmetic logic unit circuit and an AND logic operation circuit.

3. A program converting method for converting a program including a high-level instruction described in a high-level programming language, into a number of low-level instructions corresponding to a machine language executable by a program executing apparatus, wherein
   the program executing apparatus comprises:
      fetching section for sequentially fetching instructions,
      decoding section for decoding the instructions fetched,
      flag holding section for holding a number of flags corresponding to different states, and
      operation executing section for executing the instructions, which execute a number of predetermined operations each accompanying a process for changing a flag, by using inputted operands commonly in the predetermined operations, to handle the flags allotted for each predetermined operation, according to results of the predetermined operations,
   the operation executing section including a number of operation circuits for executing the predetermined operations in parallel by using the operands commonly in the predetermined operations, such that each operation circuit executes each the predetermined operation to handle the flag allotted to the predetermined operation according to the result of the predetermined operation,
   and wherein
      the program converting method converts a high-level flag-using instruction into the number of low-level instructions including an operation process instruction and a flag dependent process instruction,
      the high-level flag-using instruction for executing the operation to set the flags allotted to the predetermined operation according to the result of the predetermined operation so that flag dependent process is executed based on the flag,
      the operation process instruction for executing the predetermined operations by the operation executing section using the inputted operands, to set the flags according to results of the predetermined operations,
      the flag dependent process instruction for executing the flag dependent process based on the flag set by the operation circuit which executed the predetermined operation instructed by the high-level flag-using instruction.

4. A program converting method according to claim 3, wherein a common instruction code is generated for low-level operation process instructions converted from a number of high-level flag-using instructions for executing different operation.

5. A program converting method according to claim 3, wherein
   a number of the high-level flag-using instructions include an arithmetic condition branch instruction and a logical condition branch instruction,
   the arithmetic condition branch instruction instructs execution of an operation for comparing two operand values to see which is larger/smaller to set/reset the flag according to a comparison result, and execution of the flag-dependent process for having an operating flow branch to a predetermined address of the program according to the flag,
   the logical condition branch instruction instructs execution of an operation for obtaining a logical product of the two operands to set/reset the flag according to whether the local product is zero or not zero, and execution of the flag-dependent process for having an operating flow branch to a predetermined address of the program according to the flag.

* * * * *